May 24, 1966 A. J. FISTER 3,253,103

PROTECTORS FOR ELECTRIC CIRCUITS

Filed Dec. 26, 1962 5 Sheets-Sheet 1

INVENTOR.
ALOYSIUS J. FISTER
BY
Roy Eilers
ATTORNEY.

INVENTOR.
ALOYSIUS J. FISTER
BY
Roy Eilers
ATTORNEY.

PROTECTORS FOR ELECTRIC CIRCUITS

Filed Dec. 26, 1962 5 Sheets-Sheet 3

INVENTOR.
ALOYSIUS J. FISTER
BY
Rey Eilers
ATTORNEY.

INVENTOR.
ALOYSIUS J. FISTER
BY
Rey Eilers
ATTORNEY.

PROTECTORS FOR ELECTRIC CIRCUITS

INVENTOR.

ALOYSIUS J. FISTER

BY

Roy Eilers

ATTORNEY.

3,253,103
PROTECTORS FOR ELECTRIC CIRCUITS

Aloysius J. Fister, Overland, Mo., assignor to McGraw-Edison Company, Elgin, Ill., a corporation of Delaware Filed Dec. 26, 1962, Ser. No. 246,937
9 Claims. (Cl. 200—120)

Figure 1:
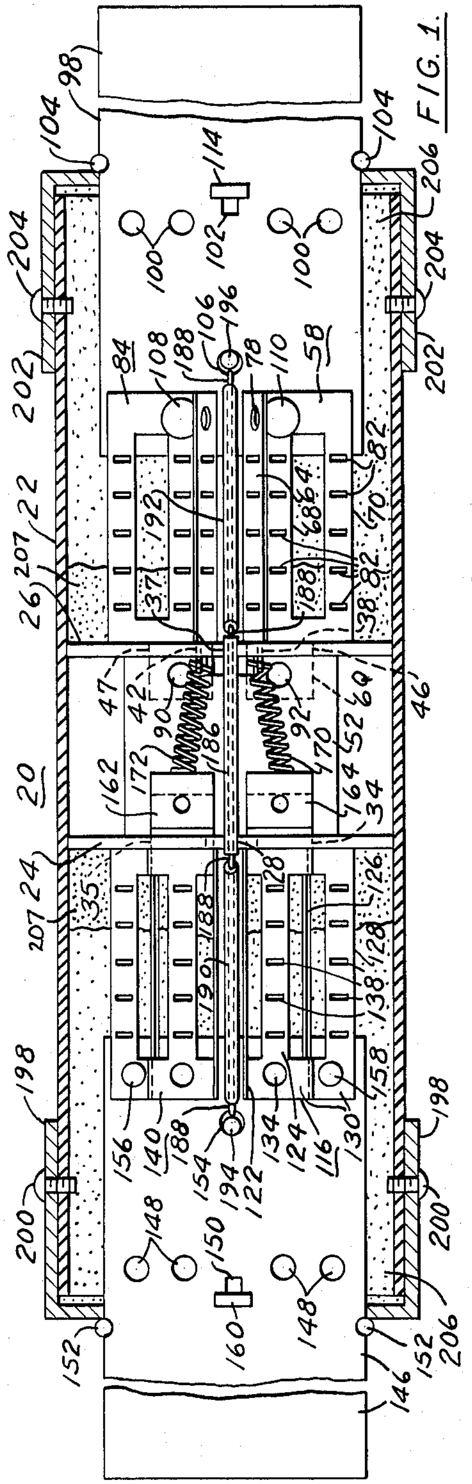

This invention relates to improvements in electric fuses. It is, therefore, an object of the present invention to provide an improved electric fuse.

Duerkob Patent Number 2,300,620, which was granted November 3, 1942, discloses dual element electric fuses that have fuse links which fuse to "open" the circuit on "short circuits" and heavy overloads and that also have solder-held connectors which can respond to long-continued lighter overloads to move to "open" the circuit. The dual element electric fuses disclosed in the said patent have proven to be very effective and useful and have constituted a material advance in the art of circuit protection. However, it would be desirable to enhance the current-limiting characteristics of those dual element electric fuses and of other dual element electric fuses, and thereby enable those various dual element electric fuses to provide the extremely fast circuit-opening action on "short circuits" and heavy overloads which is so frequently desirable under the present conditions.

The present invention enhances the current-limiting characteristics of dual element electric fuses by providing those electric fuses with fusible elements which have "weak spots" of unusually small cross section. The present invention does this by reducing the total of the cross sections of the "weak spots" of those fusible elements below the total of the cross sections of the "weak spots" of fuse links of prior dual element electric fuses of the same rating, and also by making the thicknesses of those fusible elements less than the thicknesses of those fuse links. It is, therefore, an object of the present invention to provide a dual element electric fuse with fusible elements that have the total of the cross sections of the "weak spots" thereof reduced below the total of the cross sections of the "weak spots" of the fuse links of prior dual element electric fuses of the same rating that have thicknesses less than the thicknesses of those fuse links.

The present invention provides such fusible elements by forming them so each of them has a plurality of elongated, readily fusible portions which are laterally spaced apart but are mechanically and electrically connected by transverse portions. These laterally spaced apart, elongated, readily-fusible portions give those fusible elements surface-to-volume ratios which are much larger than the surface-to-volume ratios of the fuse links previously used in dual element electric fuses of the same rating; and those much larger surface-to-volume ratios enable each fusible element provided by the present invention to dissipate much more heat than could be dissipated by the corresponding fuse link of a prior dual element electric fuse of the same rating. The resulting greater heat dissipation permits each fusible element provided by the present invention to have a smaller total cross sectional area for its "weak spots" than could the corresponding fuse link of a prior dual element electric fuse of the same rating. Further, those elongated, readily-fusible portions subdivide that smaller total cross sectional area for the "weak spots" into even smaller cross sectional areas. The overall result is that the cross section of each "weak spot" in the fusible elements for the dual element electric fuse provided by the present invention can be just a fraction of the cross section of each "weak spot" in the corresponding fuse link of a prior dual element electric fuse of the same rating. It is, therefore, an object of the present invention to provide a dual element electric fuse wherein each fusible element has a plurality of elongated, readily-fusible portions that are laterally spaced apart but are mechanically and electrically connected by transverse portions.

The cross sections of the "weak spots" of the fuse links of dual element electric fuses have, for a number of years, been made quite small; and "weak spots" of very small cross section have been formed by slotting those fuse links—the portions of those fuse links which defined the ends of the slots constituting the "weak spots." However, because slotting operations are successful only when a minimum width of metal is left at each end of each slot, it has been impractical to reduce the widths of the "weak spots" of fuse links below predetermined minimum values. Further, because the fuse links of dual element electric fuses have to be sufficiently strong to be handled during the assembling of those electric fuses, it has heretofore been considered impractical to materially reduce the thicknesses of the "weak spots" in those fuse links. However, by providing fusible elements which have a plurality of elongated, readily-fusible portions that are parallel to each other and that have the ends thereof interconnected by transverse portions, the present invention is able to provide fusible elements that have "weak spots" of very small cross section but that are sufficiently strong to be handled while they are assembled with other components of dual element electric fuses.

Each of the fusible elements of the dual element electric fuse provided by the present invention has an end to which either a connector or a heat-absorbing member can be secured, has a second end to which a fuse terminal can be secured, and has a plurality of laterally spaced apart, elongated, readily-fusible portions extending between those ends. The laterally spaced apart, elongated, readily-fusible portions of the fusible elements are important in providing the heat transference to the arc-quenching filler which permits the total cross sectional areas of the "weak spots" of those fusible elements to be reduced. Also, those laterally spaced apart, elongated, readily-fusible portions of the fusible elements are important because they permit the thickness of each "weak spot" to be less than the thickness of each "weak spot" in the fuse links of prior dual element electric fuses of the same rating. The transverse portions of the fusible elements provided by the present invention are important in stiffening and strengthening those fusible elements; but they are even more important in connecting those laterally spaced apart, elongated, readily fusible portions in parallel relation and in obviating the need of one connector for each elongated, fusible portion. By connecting the laterally spaced apart, readily-fusible portions of each fusible element in parallel, the transverse portions of that fusible element keep variations in the resistances of those elongated, readily-fusible portions from prematurely "opening" the circuit. Specifically, if one of the elongated, readily-fusible portions of one of the fusible elements provided by the present invention has less resistance than other of those elongated, readily-fusible portions, that one elongated, readily-fusible portion will initially carry more current than will the said other of those elongated, readily-fusible portions. That increased current will make that one elongated, readily-fusible portion hotter than the said other of those elongated, readily-fusible portions; and, as that one elongated, readily-fusible portion becomes hotter, its resistance will increase until that resistance approaches or equals the resistance of the said other of those elongated, readily-fusible portions. As a result the resistances of, and the currents flowing through, the various elongated, readily-fusible portions of the fusible element provided by the present invention will tend to equalize themselves; and hence an unusually conductive, elongated, readily-fusible portion of that fusible element can not upset the thermal balance in the dual element electric fuse in which that fusible element is mounted and thus can not cause premature "opening" of the circuit. By obviating the need of one connector for each readily-fusible portion, the transverse portions of the fusible element provided by the present invention keep an unusually conductive, elongated, readily fusible portion from heating its connector sufficiently to cause that connector to "open" prematurely. In these various ways, the elongated, readily-fusible portions and the transverse portions of the fusible elements provided by the present invention make it possible to greatly reduce the cross sections of the "weak spots" of those fusible elements without unduly weakening those fusible elements and without permitting premature opening of the circuit. It is, therefore, an object of the present invention to provide a fusible element, for a dual element electric fuse, which has an end to which either a connector or a heat-absorbing member can be secured, which has a second end to which a fuse terminal can be secured, and which has a plurality of laterally spaced apart, elongated, readily-fusible portions extending between those ends.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 2:
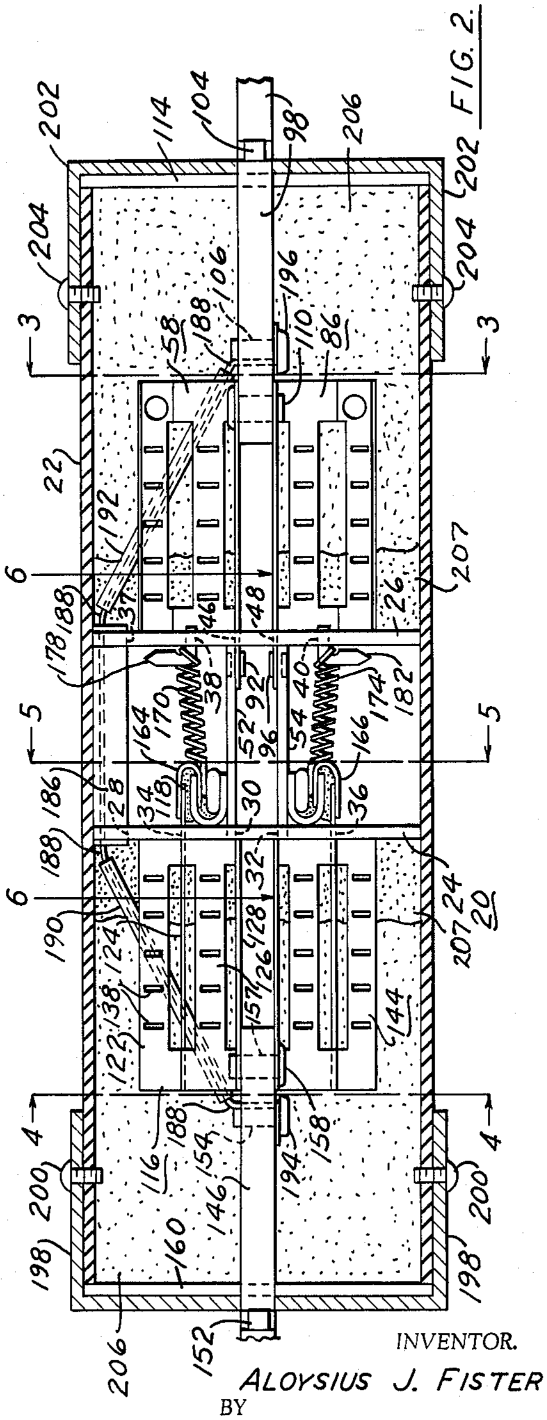
Figure 3:
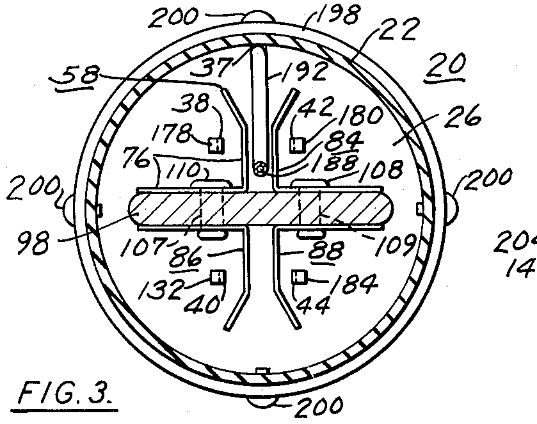
Figure 4:
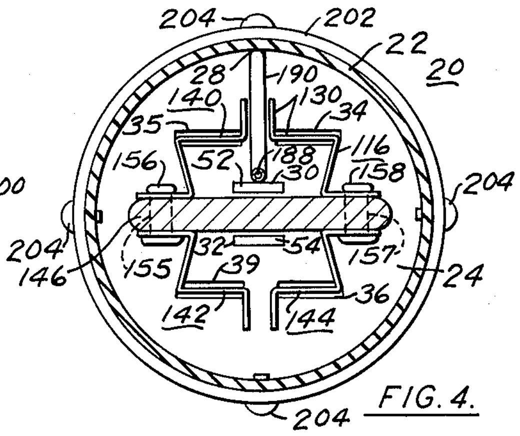
Figure 5:
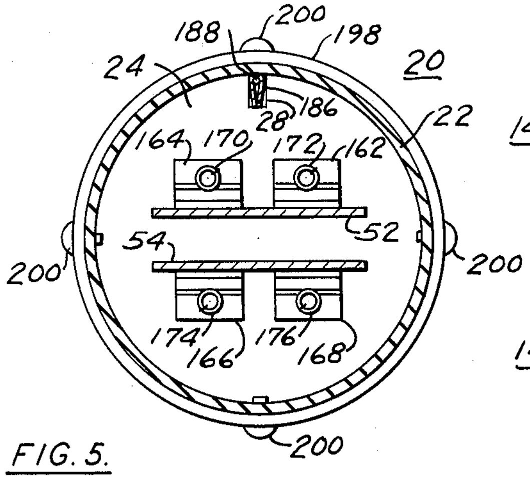
Figure 6:
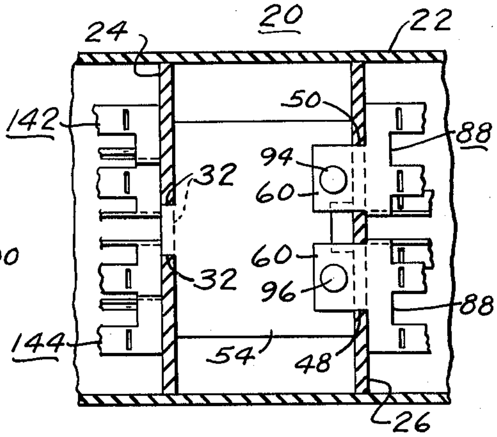
Figure 7:
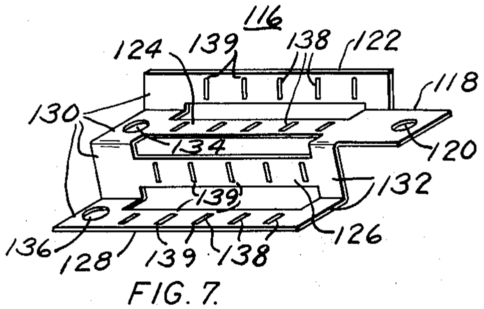
Figure 8:
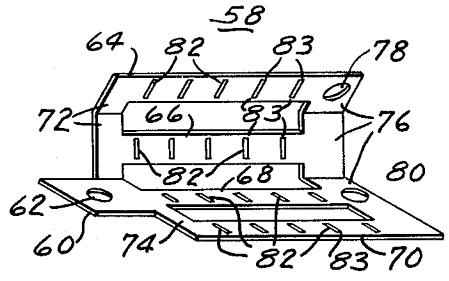
Figure 9:
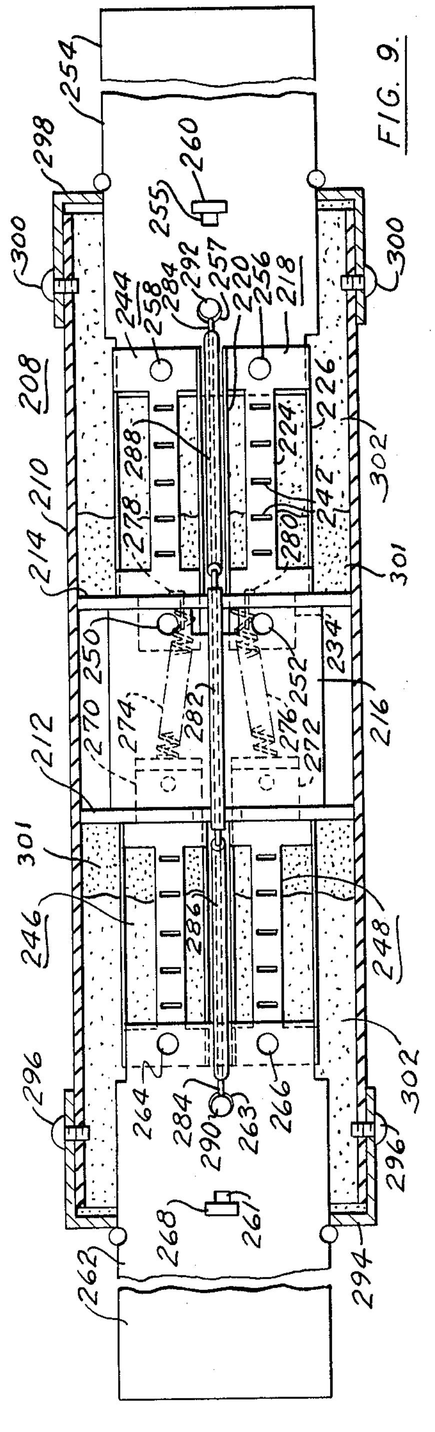
Figure 10:
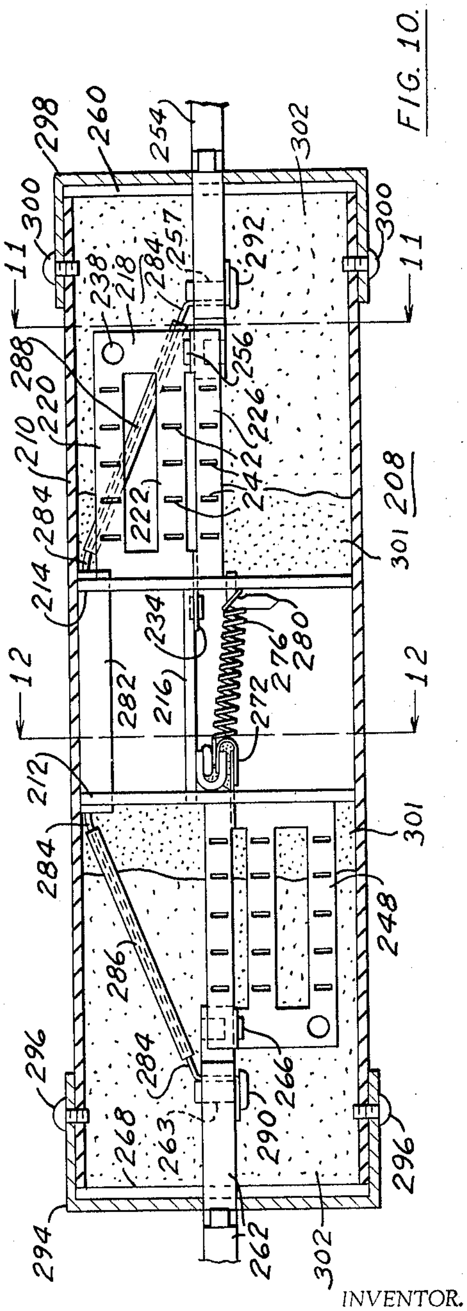
Figure 11:
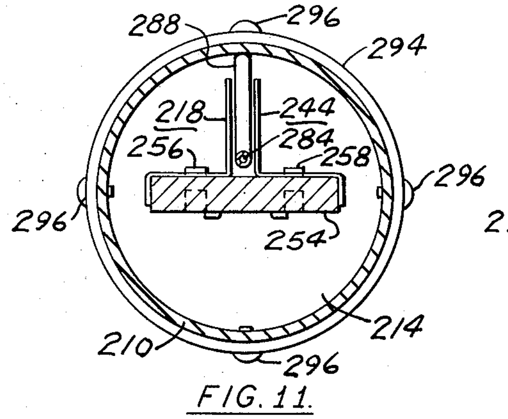
Figure 12:
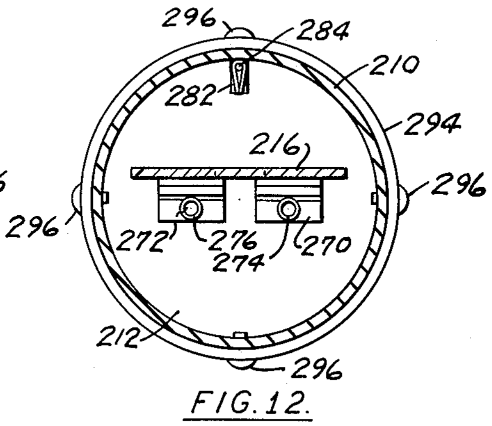
Figure 13:
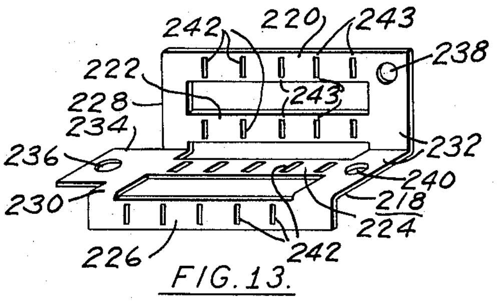
Figure 16:
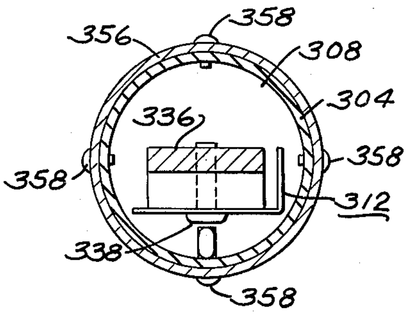
Figure 17:
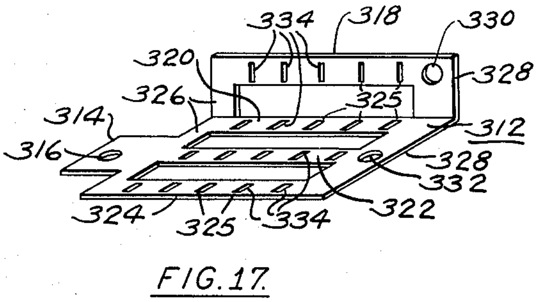
Figure 14:
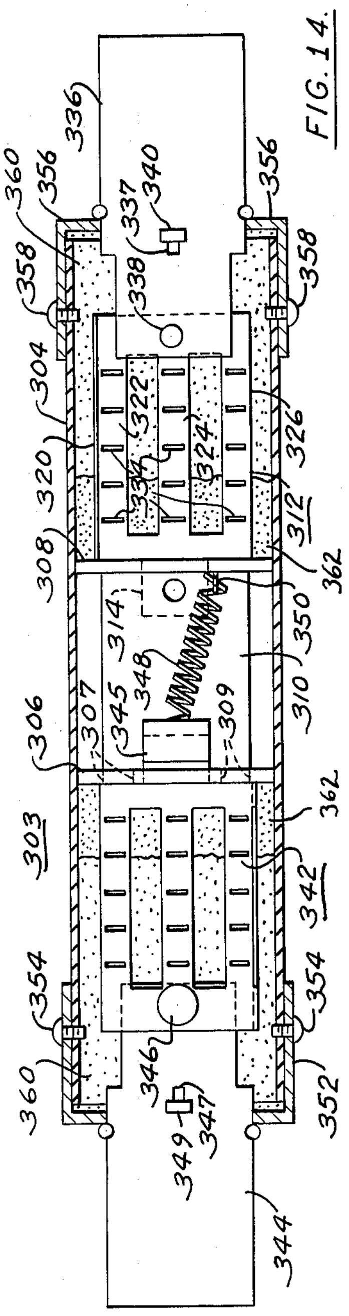
Figure 15:
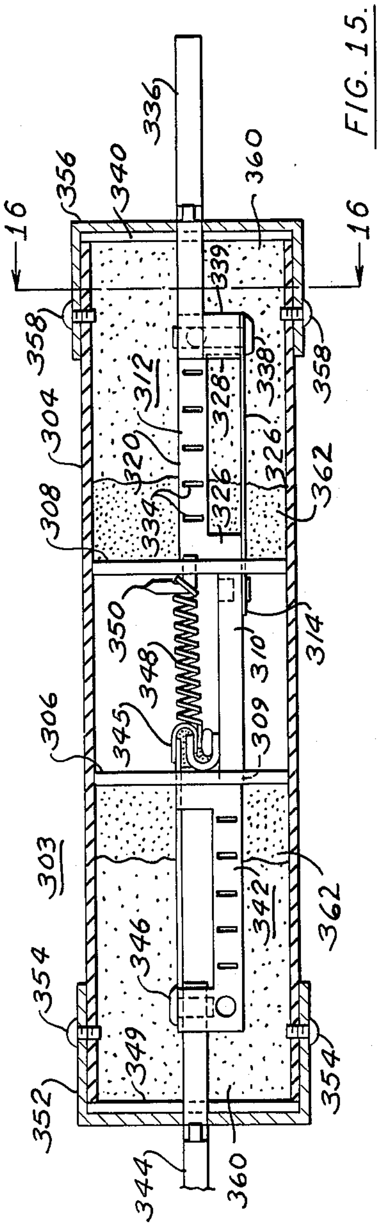

In the drawing, FIG. 1 is a partially-broken, sectional, plan view through one form of electric fuse that is made in accordance with the principles and teachings of the present invention, FIG. 2 is a broken, sectional, elevational view through the electric fuse of FIG. 1, FIG. 3 is a sectional view through the electric fuse of FIGS. 1 and 2, and it is taken along the plane indicated by the line 3—3 in FIG. 2, FIG. 4 is another sectional view through the electric fuse of FIGS. 1 and 2, and it is taken along the plane indicated by the line 4—4 in FIG. 2, FIG. 5 is still another sectional view through the electric fuse of FIGS. 1 and 2, and it is taken along the plane indicated by the line 5—5 in FIG. 2, FIG. 6 is a sectional plan view through the electric fuse of FIGS. 1 and 2, and it is taken along the plane indicated by the line 6—6 in FIG. 2, FIG. 7 is a perspective view of one of the fusible elements used in the electric fuse of FIGS. 1 and 2, FIG. 8 is a perspective view of another of the fusible elements used in the electric fuse in FIGS. 1 and 2, FIG. 9 is a partially-broken, sectional, plan view through another form of electric fuse that is made in accordance with the principles and teachings of the present invention, FIG. 10 is a broken, sectional, elevational view through the electric fuse of FIG. 9, FIG. 11 is a sectional view through the electric fuse of FIGS. 9 and 10, and it is taken along the plane indicated by the line 11—11 in FIG. 10, FIG. 12 is another sectional view through the electric fuse of FIGS. 9 and 10, and it is taken along the plane indicated by the line 12—12 in FIG. 10, FIG. 13 is a perspective view of one of the fusible elements used in the electric fuse of FIGS. 9 and 10, FIG. 14 is a sectional, plan view of a third form of electric fuse that is made in accordance with the principles and teachings of the present invention, FIG. 15 is a broken, sectional, elevational view of the electric fuse of FIG. 14, FIG. 16 is a sectional view through the electric fuse of FIGS. 14 and 15, and it is taken along the plane indicated by the line 16—16 in FIG. 15, and FIG. 17 is a perspective view of one of the fusible elements used in the electric fuse of FIGS. 14 and 15.

Referring to FIGS. 1–8 in detail, the numeral 20 generally denotes a cartridge-type electric fuse; and that fuse has a tubular casing 22. That tubular casing can be of fiber, glass melamine, or any other suitable material. Circular discs 24 and 26 are dimensioned to telescope within the interior of the tubular casing 22, and those discs can be made of fiber.

A slot-like opening 28 is provided in the disc 24 adjacent the periphery of that disc, as indicated particularly by FIG. 5; and that opening is generally radially-directed. A horizontally-directed slot 30 is formed in the disc 24; and that slot is disposed a short distance above the geometric center of that disc. A horizontally-directed slot 32 is formed in the disc 24; and that slot is disposed a short distance below the geometric center of that disc. The slots 30 and 32 are in vertical registry with each other; and the slot 32 is shown by solid lines in FIG. 6 while both slots are shown by dotted lines in FIG. 2. A horizontally-directed slot 34 is formed in the disc 24 above the level of the slot 30; and a horizontally-directed slot 35 also is formed in the disc 24 above the level of the slot 30. A horizontally-directed slot 36 is formed in the disc 24 below the level of the slot 32; and a horizontally-directed slot 39 also is formed in the disc 24 below the level of the slot 32. The slots 34 and 35 are in horizontal registry, the slots 36 and 39 are in horizontal registry, the slots 34 and 36 are in vertical registry, and the slots 35 and 39 are in vertical registry.

The numeral 37 denotes a slot-like opening in the disc 26 adjacent the periphery of that disc; and that opening is radially-directed. The opening 37 and the opening 28 are the same in size; and those openings are in register with each other.

Four small openings 38, 40, 42 and 44 are provided in the disc 26 as shown by FIGS. 1–3. The openings 38 and 42 are disposed above the level of the geometric center of the disc 26 and are spaced on opposite sides of a vertical line extending through that center. The openings 40 and 44 are disposed below the level of the geometric center of the disc 26 and also are disposed on opposite sides of a vertical line extending through that center. Horizontally-directed slots 46 and 47 are formed in the disc 26; and those slots are disposed above the level of the geometric center of that disc. Also, those slots are disposed on opposite sides of a vertical line extending through that center. Horizontally-directed slots 48 and 50 are formed in the disc 26, and those slots are disposed below the level of the geometric center of that disc. Further, the slot 48 is in vertical registry with the slot 46 while the slot 50 is in vertical registry with the slot 47. The slots 48 and 50 are shown by solid lines in FIG. 6, and the slots 46, 47 and 48 are shown by dotted lines in FIGS. 1 and 2.

The numeral 52 denotes a metal heat-absorbing plate which is generally rectangular in plan and which has a tongue that extends into the slot 30 in the disc 24. The numeral 54 denotes a metal heat-absorbing plate which is identical to the heat-absorbing plate 52, and the tongue of that heat-absorbing plate extends into the slot 32 in the disc 24. The heat-absorbing plates 52 and 54 are preferably formed with notches at those ends thereof which are opposite to the ends on which the tongues are formed; because such an arrangement makes it possible for a succession of heat-absorbing plates to be punched out of a long flat plate with minimum waste.

The numeral 58 in FIG. 8 generally denotes one of the fusible elements used in the electric fuse of FIGS. 1 and 2; and that fusible element has a tongue 60 with an opening 62 therein. Elongated, readily-fusible portions 64, 66, 68 and 70 are disposed to the right of the tongue 60, as that tongue is viewed in FIG. 8. Transverse portions 72 and 74 connect the left-hand ends of the elongated, readily-fusible portions 64, 66 and 70 with the tongue 60 while the left-hand end of the elongated, readily-fusible portion 68 is directly connected to that tongue. The right-hand ends of the elongated, readily-fusible portions 64, 66, 68 and 70 are interconnected by a transverse portion 76; and openings 78 and 80 are formed in that transverse portion. Each of the elongated portions 64, 66, 68 and 70 has a number of transversely-directed slots 82 therein; and those slots are almost as long as those elongated portions are wide. Consequently, those slots help form narrow "weak spots" 83 for the fusible element 58 which are quite narrow. As indicated particularly by FIGS. 3 and 8, the tongue 60, the transverse portion 74 and the elongated readily-fusible portions 68 and 70 lie in one plane, while the elongated, readily-fusible portion 66 lies in a plane which is at right angles to that plane. In addition, the elongated, readily-fusible portion 64 lies in a plane which inclines away from the plane of the elongated, readily-fusible portion 66 at an angle of about thirty degrees.

The elongated, readily-fusible portions 64, 66, 68 and 70 have very small cross sections—particularly at the "weak spots" 83; and, as a result, each of those elongated, readily-fusible portions is relatively weak. However, because the transverse portions 72, 74 and 76 interconnect those elongated, readily-fusible portions, the fusible element 58 is many times stronger than any one of those elongated, readily-fusible portions. Consequently, that fusible element can readily be handled and worked with as a unit without any distortion of the elongated, readily-fusible portions thereof.

A fusible element 88 is provided which is identical to the fusible element 58; and fusible elements 84 and 86 are provided which are mirror images of the fusible element 58. All of the fusible elements 58, 84, 86 and 88 are made with the same die; but the fusible elements 58 and 88 are bent one way while the fusible elements 84 and 86 are bent the opposite way.

The fusible element 84 and the fusible element 58 are disposed with the tongues 60 thereof underlying the right-hand end of the heat-absorbing plate 52, as that plate is viewed in FIGS. 1 and 2. The opening 62 in those tongues are in register with the openings in that heat-absorbing plate, and rivets 90 and 92 extend through the openings in the tongues 60 of those fusible elements and into the openings in that heat-absorbing plate. Those rivets fixedly secure those tongues to that heat-absorbing plate. The fusible elements 86 and 88 are disposed with their tongues 60 overlying the right-hand end of the heat-absorbing plate 54, as that plate is viewed in FIGS. 2 and 6. The openings 62 in those tongues will be in register with openings in the heat-absorbing plate 54; and rivets 94 and 96 will extend through the openings 62 and through the openings in that heat-absorbing plate. Those rivets will fixedly secure the fusible elements 86 and 88 to the heat-absorbing plate 54. The tongue 60 of the fusible element 58 is disposed within the slot 46 in the disc 26, the tongue 60 of the fusible element 84 is disposed within the slot 47 in that disc, the tongue 60 of the fusible element 86 is disposed within the slot 48 in that disc, and the tongue 60 of the fusible element 88 is disposed within the slot 50 in that disc. The engagements between those tongues and those slots will be close and will hold the right-hand ends of the heat-absorbing plates 52 and 54 and the left-hand ends of the fusible elements 58, 84, 86 and 88 fixed relative to the disc 26.

The numeral 98 denotes an elongated metal terminal which has a number of circular openings 100 therein intermediate the ends thereof. A T-shaped opening 102 is provided in that terminal adjacent the two center-most openings 100. The numeral 104 denotes portions of the terminal 98 which are formed by a staking operation and which project outwardly beyond the side edges of that terminal. The staking operation which forms the portions 104 will be performed after the various components of the electric fuse of FIGS. 1 and 2 have been assembled. An opening 106 is formed in the terminal 98, as shown particularly by FIG. 1; and openings 107 and 109 also are formed in that terminal, as shown by FIG. 3. The opening 107 is in register with the openings 80 of the fusible elements 58 and 86; and a rivet 110 extends through those openings. That rivet will permanently connect the terminal 98 to the fusible elements 58 and 86. The opening 109 is in register with the openings 80 in the fusible elements 84 and 88; and a rivet 108 extends through those openings. That rivet will permanently secure the fusible elements 84 and 88 to the terminal 98.

The numeral 114 denotes an elongated bar which can telescope into the right-hand portion of the T-shaped opening 102 in the terminal 98. As indicated particularly by FIG. 2, the bar 114 has a length equal to the outer diameter of the tubular casing 22.

The numeral 116 generally denotes another fusible element that is used in the electric fuse of FIGS. 1 and 2; and that fusible element has a tongue 118 with an opening 120 therein. Elongated, readily-fusible portions 122, 124, 126 and 128 extend to the left from the tongue 118, as that tongue is viewed in FIG. 7. A transverse portion 130 connects the left-hand ends of all of those elongated, readily-fusible portions; and a transverse portion 132 connects the right ends of the elongated, readily-fusible portions 126 and 128 to each other and to the tongue 118. The right-hand ends of the elongated, readily-fusible portions 122 and 124 are directly connected to that tongue. Openings 134 and 136 are provided in the transverse portion 130 of the fusible element 116.

A number of transversely-extending slots 138 are formed in the elongated, readily-fusible portions 122, 124, 126 and 128; and those slots are almost as long as those elongated, readily-fusible portions are wide. Consequently, those slots help form narrow "weak spots" 139 for the fusible element 116. As indicated particularly by FIGS. 4 and 7, the elongated, readily-fusible portions 128 and 124 are parallel to each other; and the elongated, readily-fusible portion 122 is at right angles to both of those elongated, readily-fusible portions. The elongated, readily-fusible portion 126 is inclined relative to the elongated, readily-fusible portion 124; and it coacts with that elongated, readily-fusible portion to subtend a large acute angle.

The elongated, readily-fusible portions 122, 124, 126 and 128 have very small cross sections—particularly at the "weak spots" 139; and, as a result, each of those elongated, readily-fusible portions is relatively weak. However, because the transverse portions 130 and 132 interconnect those elongated, readily-fusible portions, the fusible element 116 is many times stronger than any one of those elongated, readily-fusible portions. Consequently, that fusible element can readily be handled and worked with as a unit without any distortion of the elongated, readily-fusible portions thereof.

A fusible element 142 is provided which is identical to the fusible element 116; and fusible elements 140 and 144 are provided which are mirror images of the fusible element 116. All of the fusible elements 116, 140, 142 and 144 are made with the die used to make the fusible elements 58, 84, 86 and 88. However, the fusible elements 116 and 142 are bent one way while the fusible elements 140 and 144 are bent the opposite way.

The fusible elements 58, 84, 86, 88, 116, 140, 142 and 144 could be made from different metals. However, copper has been found to be very usable; and copper is readily available and relatively inexpensive.

The fusible elements 116 and 140 have the tongue 118 thereof extending through the slots 34 and 35 in the disc 24; and the fusible elements 144 and 142 have the tongues thereof extending through the slots 36 and 39 in that disc. The slots 34, 35, 36 and 39 are deeper than the thicknesses of the tongues 118 of the fusible elements 116, 140, 144 and 142; and hence those tongues can be moved vertically relative to those slots.

The numeral 146 denotes an elongated metal terminal which is similar to the elongated metal terminal 98. That terminal has openings 148 therein which are comparable to the openings 100 in the terminal 98; and the terminal 146 has a T-shaped opening 150 which is comparable to the opening 102 in the terminal 98. Further, the terminal 146 has portions 152 that can be formed by a staking operation; and, as in the case of the staked portions 104, the staked portions 152 will be formed after the components of the electric fuse of FIGS. 1 and 2 have been assembled. The terminal 146 also has an opening 154 that is comparable to the opening 106 in the terminal 98.

The terminal 146 has an opening 155 which is in register with the openings 136 in the fusible elements 140 and 142. A rivet 156 extends through those openings and will hold the fusible elements 140 and 142 in assembled relation with the terminal 146. That terminal also has an opening 157 which is in register with the openings 136 of the fusible elements 116 and 144. A rivet 158 extends through those openings and holds the fusible elements 116 and 144 in assembled relation with the terminal 146.

An elongated bar 160 can be disposed within the left-hand portion of the T-shaped opening 150 in the terminal 146. As indicated particularly by FIG. 2, the bar 160 has a length equal to the outer diameter of the tubular casing 22 of the electric fuse 20.

The openings 80 in the fusible elements 58, 84, 86 and 88 correspond with the openings 134 in the fusible elements 116, 140, 142 and 144. Similarly, the openings 78 in the fusible elements 58, 84, 86 and 88 correspond with the openings 136 in the fusible elements 116, 140, 142 and 144. While the openings 134 in the fusible elements 116, 140, 142 and 144 are not used, the corresponding openings 80 in the fusible elements 58, 84, 86 and 88 accommodate the rivets 108 and 110. Similarly, while the openings 78 in the fusible elements 58, 84, 86 and 88 are not used, the corresponding openings 136 in the fusible elements 116, 140, 142 and 144 accommodate the rivets 156 and 158. The two openings 78 and 80 are formed in the fusible elements 58, 84, 86 and 88 and the two openings 134 and 136 are formed in the fusible elements 116, 140, 142 and 144 because all of those fusible elements are made with the same die.

The numeral 162 denotes a movable connector which is similar to the movable connectors shown in the said Duerkob patent. Connectors 164, 166 and 168 also are provided; and those four connectors are mounted, respectively, adjacent the tongues 118 of the fusible elements 140, 116, 144 and 142. Also, those connectors are mounted adjacent the heat-absorbing plates 52 and 54. Specifically, the connector 162 engages the tongue 118 of the fusible element 140 and also engages the heat-absorbing plate 52. The connector 164 engages the tongue 118 of the fusible element 116 and also engages the heat-absorbing plate 52. The connector 166 engages the tongue 118 of the fusible element 144 and also engages the heat-absorbing plate 54; and the connector 168 engages the tongue 118 of the fusible element 142 and also engages the heat-absorbing plate 54. Heat softenable solder will normally secure the connectors 162, 164, 166 and 168 to those tongues and to those heat-absorbing plates. However, when that solder reaches a predetermined temperature, it will be unable to hold those connectors in electrical-conducting relation with those tongues and with those heat-absorbing plates, and those connectors will then be free to move away from those tongues. Elongated helical extension springs 170, 172, 174 and 176 will urge those connectors to move away from the tongues 118 of the various fusible elements. Specifically, the spring 170 will urge the connector 164 away from the tongue 118 of the fusible element 116, the spring 172 will urge the connector 162 away from the tongue 118 of the fusible element 140, the spring 174 will urge the connector 166 away from the tongue 118 of the fusible element 144, and the spring 176 will urge the connector 168 away from the tongue 118 of the fusible element 142. The right-hand ends of the helical extension springs 170, 172, 174 and 176 will be held by L-shaped hooks 178, 180, 182 and 184 respectively. These hooks have portions thereof extending through the openings 38, 42, 40, and 44 in the disc 26; and those portions are suitably riveted over to permanently secure them within those openings.

The numeral 186 denotes an elongated, generally-flat, sleeve which is disposed within the openings 28 and 37, respectively in the discs 24 and 26. A shunt wire 188 extends through the sleeve 186; and that wire has one end thereof telescoped down into the opening 154 in the terminal 146 while having the other end thereof telescoped down into the opening 106 in the terminal 98. A rivet 194 fixedly holds the one end of the shunt wire 188 within the opening 154, and a rivet 196 fixedly holds the other end of that shunt wire within the opening 106. Insulation 190 surrounds that portion of the shunt wire 188 which extends between the opening 154 and the sleeve 186, and insulation 192 surrounds that portion of the shunt wire 188 which extends between the opening 106 and the sleeve 186. As indicated particularly by FIG. 1, the shunt wire 188 is disposed between the fusible elements 116 and 140 and between the fusible elements 58 and 84.

Soft solder will preferably be used adjacent the rivets 90, 92, 94 and 96, adjacent the rivets 156 and 158, adjacent the rivets 108 and 110, and adjacent the rivets 194 and 196. That solder will assure good electrical contact between the fusible elements 58, 84, 86 and 88 and the heat-absorbing plates 52 and 54, between the fusible elements 116, 140, 142 and 144 and the terminal 146, between the fusible elements 58, 84, 86 and 88 and the terminal 98, and between the shunt wire 88 and the terminals 146 and 98.

The terminals 146 and 98, the fusible elements 116, 140, 142 and 144, the disc 24, the heat-absorbing plates 52 and 54, the connectors 162, 164, 166 and 168, the disc 26, the fusible elements 58, 84, 86 and 88, the terminal 98, the hooks 178, 180, 182 and 184, the springs 170, 172, 174 and 176, the sleeve 186, and the shunt wire 188 constitute an electric fuse unit which can readily be handled as an entity. That electric fuse unit can be telescoped into the casing 22 of the electric fuse 20, or that casing can be telescoped over that electric fuse unit.

Once that electric fuse unit is disposed within the casing 22, the elongated bars 160 and 114 can be disposed within the T-shaped openings 150 and 102, respectively, in the terminals 146 and 98. Those bars will abut the ends of the casing 22 of the electric fuse 20, and will thereby prevent axial shifting of the electric fuse unit relative to that casing.

Thereupodn, a cup-shaped cap 198 will be telescoped over the left-hand end of the terminal 146, and will have the closed end thereof moved into abutting engagement with the bar 160. Openings in the cylindrical portion of that cap will align themselves with openings in the casing 22; and fasteners 200, shown as screws, will be passed through those aligned openings to permanently secure that cap to that casing. Similarly, a cup-shaped cap 202 will be telescoped over the right-hand end of the terminal 98, and will have the closed end thereof moved into abutting engagement with the bar 114. Openings in the cylindrical portion of that cap will align themselves with openings in the casing 22; and fasteners 204, shown as screws, will be passed through those aligned openings to permanently secure that cap to that casing. At this time, the portions 152 can be formed on the terminal 146 by a staking operation, and the portions 104 can be formed on the terminal 98 by a staking operation. The portions 152 and 104 will abut the outer faces of the closed ends of the caps 198 and 202 and will fixedly prevent axial shifting of the electric fuse unit relative to the casing 22.

The terminals 146 and 98 can be disposed within fuse clips of standard and usual design; and current will flow from one of those fuse clips via terminal 146, fusible elements 116, 140, 142 and 144, connectors 164, 162, 168 and 166, heat-absorbing plates 52 and 54, fusible elements 58, 84, 88 and 86, and terminal 98 to the other fuse clip. A very small amount of current will flow from terminal 146 through the shunt wire 188 to the terminal 98, but that amount of current will be almost negligible.

As long as the current flowing through the electric fuse 20 is the rated current of that fuse, the heat-softenable solder which normally connects connectors 164, 162, 168 and 166, respectively, to fusible elements 116, 140, 142, and 144 will hold those connectors in current conducting relation with the tongues 118 of those fusible elements. However, if the current flowing through that electric fuse rises to a predetermined, relatively low overload level and then remains there, that solder will soften and permit the helical extension springs 170, 172, 176 and 174 to move those connectors away from those fusible elements. The thermal masses of the heat-absorbing plates 52 and 54 will provide a desirable time delay before the heat-softenable solder can soften.

If a heavy overload or short circuit should occur, the elongated, readily-fusible portions 122, 124, 126 and 128 of fusible elements 116, 140, 142 and 144, or the elongated, readily-fusible portions 64, 66, 68 and 70 of fusible elements 58, 84, 86 and 88, or both of those groups of elongated, readily-fusible portions will fuse. Filler materials 206 and 207 surround fusible elements 116, 140, 142 and 144, and further filler materials 206 and 207 surround fusible elements 58, 84, 86 and 88, and those filler materials will quickly help extinguish any arcs that may form as those fusible elements fuse. The filler material 26 is silicic and the filler material 207 is non-silicic, preferably calcium sulfate.

When the connectors 162, 164, 166 and 168 move to open the circuit, that circuit will be momentarily maintained by the shunt wire 188; but, almost immediately, that shunt wire will fuse and open the circuit. When the elongated, readily-fusible portions of the various fusible elements fuse, the shunt wire 188 may also fuse. However, if that shunt wire does not fuse with those elongated, readily-fusible portions, it will fuse immediately thereafter.

The "weak spots" 83 and 139, respectively, of the fusible elements 58, 84, 86 and 88 and of the fusible elements 116, 140, 142 and 144 have cross sections which are less than the cross sections of the "weak spots" of the fuse links in prior dual element electric fuses of the same rating. The ability to provide these importantly small cross sections is due to the fact that the fusible elements 58, 84, 86, 88, 116, 140, 142 and 144 can, because of the unusually large heat-dissipating capabilities which their unusually large surface-to-volume ratios give them, have the total cross sectional areas of the "weak spots" thereof reduced below the total cross sectional areas of the "weak spots" of the fuse links of prior dual element electric fuses of the same rating. Further, this is due to the fact the cross sectional area of each "weak spot" 83 or 139 is but a small fraction of the reduced total cross sectional areas of the "weak spots" of the electric fuse 20. The overall result is that the electric fuse 20 has very desirable current-limiting characteristics and yet will prevent premature movement of any of the connectors 162, 164, 166 and 168.

The fusible elements 58, 84, 86 and 88 and the fusible elements 116, 140, 142 and 144 are bent differently to enable the tongues 60 of the former to engage the heat-absorbing plates 52 and 54 and to enable the tongues 118 of the latter to be spaced from those heat-absorbing plates. The spacing between the tongues 118 and those heat-absorbing plates is large enough to discourage the formation of arcs as the connectors 162, 164, 166 and 168 move away from those tongues. The elongated, readily-fusible portions 64 of the fusible elements 58, 84, 86 and 88 are inclined away from the planes of the elongated, readily-fusible portions 66 of those fusible elements to increase the spacing between the free edges of the former elongated, readily-fusible portions and the inner periphery of the casing 22. That increased spacing enables the elongated, readily-fusible portions 64 to be fully surrounded and imbedded within a large mass of arc quenching filler materials 206 and 207.

Referring to FIGS. 9–13, the numeral 208 generally denotes another form of electric fuse that is made in accordance with the principles and teachings of the present invention. That electric fuse has a tubular casing 210 which can be made of fiber, glass melamine, or other suitable material. Circular discs 212 and 214 are dimensioned to fit snugly within the interior of the tubular casing 210, and those discs are notched to accommodate a flattened sleeve 282. The disc 212 also is slotted to receive a tongue on a heat-absorbing plate 216. Further, that disc is slotted to receive the tongues 234 of two fusible elements 246 and 248. The disc 214 is slotted to accommodate the tongues 234 of fusible elements 218 and 244.

The fusible element 218 has an opening 236 in the tongue thereof, and has elongated, readily-fusible portions 220, 222, 224 and 226. A transverse portion 228 connects the left-hand ends of the elongated, readily-fusible portions 220 and 222 with the tongue 234, as that tongue is viewed in FIG. 13. A transverse portion 230 connected the left-hand end of the elongated, readily-fusible portion 226 with the tongue 234, and the left-hand end of the elongated, readily-fusible portion 224 is directly connected to the tongue 234, as that tongue is viewed in FIG. 13. A transverse portion 232 connects the right-hand ends of the elongated, readily-fusible portions 220, 222, 224, and 226, as those elongated, readily-fusible portions are viewed in FIG. 13. Openings 238 and 240 are provided in the transverse portion 232. A number of slots 242 are provided in each of the elongated, readily-fusible portions 220, 222, 224 and 226; and those slots are almost as long as those elongated, readily-fusible portions are wide. As result, those slots form "weak spots" 243 in the elongated, readily-fusible portions 220, 222, 224 and 226.

As indicated particularly by FIG. 13, the elongated, readily-fusible portions 220 and 222 lie in the same plane, the elongated, readily-fusible portion 224 lies in a plane which is at right angles to the plane in which the elongated, readily-fusible portions 220 and 222 lie, and the elongated, readily- fusible portion 226 lies in a plane which is at right angles to the plane in which the elongated, readily-fusible portion 224 lies. Hence, the elongated, readily-fusible portion 226 lies in a plane which is parallel to the plane in which the elongated, readily-fusible portions 220 and 222 lie. As indicated by FIG. 13, the openings 236 in the tongue 234 and the opening 240 in the transverse portion 232 lie in the same plane.

The fusible element 248 is identical to the fusible element 218. The fusible elements 244 and 246 are identical to each other and are mirror images of the fusible element 218. All of the fusible elements 218, 244, 246 and 248 are made with the die that is used to make the fusible elements 58, 84, 86, 88, 116, 140, 142 and 144. The openings 238 in the fusible elements 218, 244, 246 and 248 are not used; but the corresponding openings 136 in the fusible elements 116, 140, 142 and 144 are used.

The numeral 254 denotes an elongated metal terminal which has a T-shaped opening 255 therein, and which has a cylindrical opening 257 therein. Two additional openings are provided in the left-hand end of the terminal 254, and those openings will be in register with the openings 240 in the transverse portions 232 of the fusible elements 218 and 244. A rivet 256 extends through the opening 240 in the transverse portion 232 of the fusible element 218 and through an aligned opening in the terminal 254, and is then riveted over to fixedly secure that fusible element to that terminal. A rivet 258 extends through the opening 240 in the transverse portion 232 of the fusible element 244 and through an aligned opening in the terminal 254, and is then riveted over to fixedly secure that fusible element to that terminal. A rivet 252 secures the tongue 234 of the fusible element 218 to the heat-absorbing plate 216, and a rivet 250 secures the tongue 234 of the fusible element 244 to that heat-absorbing plate. An elongated, bar 260 can be set within the T-shaped opening 255 in the terminal 254, and that bar will have a length approximately equal to the outer diameter of the tubular casing 210, as shown particularly by FIG. 10.

The numeral 262 denotes an elongated metal terminal which is substantially identical to the terminal 254. A T-shaped opening 261 is provided in that terminal, and a cylindrical opening 263 is provided in that terminal. In addition, two more openings are provided in the terminal 262, adjacent the right-hand end of that terminal. One of those two openings receives a rivet 266 which extends through the opening 240 in the transverse portion 232 of the fusible element 248 and is then riveted over to permanently secure that fusible element to that terminal. The other of those two openings accommodates a rivet 264 which extends through the opening 240 in the transverse portion 232 of the fusible element 246 and is then riveted over to permanently secure that fusible element in that terminal. An elongated bar 268 can be set within the T-shaped opening 261 in the terminal 262, and that bar has a length equal to the outer diameter of the casing 210, as shown particularly by FIG. 10.

Connectors 270 and 272, which are similar to the connectors in the electric fuse 20, are firmly held in assembled relation with the tongue 234 of the fusible elements 246 and 248 and with the heat-absorbing plate 216 by heat-softenable solder. Helical extension springs 274 and 276 have their left-hand ends extending into and made part of those connectors and have the right-hand ends thereof held by hooks 278 and 280; which are, in turn, fixedly held by the disc 214. Those helical extension springs bias the connectors 270 and 272 out of engagement with the tongues 234 on the fusible elements 246 and 248, and will move those connectors out of engagement with those tongues whenever the solder softens, as it will do when the temperature of the heat-absorbing plate 216 reaches a predetermined level.

A shunt wire 284 extends through the flattened sleeve 282, and it has one end thereof telescoped down into the opening 263 in terminal 262 and is held by a rivet 290. The other end of that shunt wire extends down into the opening 257 in terminal 254 and is held by a rivet 292. Insulation 286 encases the portion of the shunt wire 284 between the sleeve 282 and the opening 263, and insulation 288 encases the portion of the shunt wire 284 between the sleeve 282 and the opening 257.

A cup-shaped cap 294 is telescoped over the left-hand end of the terminal 262 until the closed end thereof abuts the elongated bar 268. At such time, openings in the cylindrical portion of the cap 294 will be in alignment with openings in the tubular casing 210; and fasteners 296, shown as screws, will be passed through those alined openings to secure that cap to that casing. Thereupon, the portions of the terminal 262, immediately adjacent the outer face of the closed end of the cap 294, will be staked, as shown by FIGS. 9 and 10.

A cup-shaped cap 298 is telescoped over the right-hand end of the terminal 254 until the closed end thereof abuts the elongated bar 260. At such time, openings in the cylindrical portion of the cap 298 will be in register with openings in the tubular casing 210; and fasteners 300, shown as screws, will be passed through those registered openings to secure that cap to that casing. At this time, the portions of the terminal 254 immediately adjacent the outer face of the cup-shaped closure 298 will be staked. The staked portions of the terminals 262 and 254 will coact with the caps 294 and 298 to prevent axial shifting of the electric fuse unit relative to the casing 210.

Soft solder can be applied to the left-hand end of the shunt wire 284, to the rivet 290, and to terminal 262. Also, soft solder can be applied to that terminal and to the transverse portions 232 of the fusible elements 246 and 248. Soft solder also can be applied to the heat-absorbing plate 216 and to the tongues 234 of the fusible elements 218 and 244. Further soft solder can be applied to the transverse portions 232 of the fusible elements 218 and 244 and to the terminal 254. In addition, soft solder can be applied to the right-hand end of the shunt wire 284, to the rivet 292, and to the terminal 254.

The terminals 262 and 254, the fusible elements 218, 244, 246 and 248, the heat-absorbing plate 216, the connectors 270 and 272, the springs 274 and 276, the discs 212 and 214, the sleeve 282, and the shunt wire 284 constitute an electric fuse unit. That electric fuse unit can be readily handled as an entity.

The terminals 262 and 254 can be disposed within fuse clips, and current can then flow from the terminal 262 via fusible elements 246 and 248, connectors 270 and 272, heat-absorbing plate 216, and fusible elements 244 and 218 to the terminal 254. In addition, a small amount of current will flow from the terminal 262 to the terminal 254 via the shunt wire 284; but that flow of current will normally be negligible.

As long as the current flowing through the electric fuse 208 does not exceed the rating of that electric fuse, the heat-softenable solder will hold the connectors 270 and 272 in engagement with the tongues 234 of the fusible elements 246 and 248. However, if the current flowing through that electric fuse rises to a predetermined, relatively low overload level and remains there for a predetermined length of time, that solder will soften and permit the helical extension springs 274 and 276 to pull those connectors away from those tongues. At such time, all of the current flowing through the electric fuse 208 will have to pass through the shunt wire 284; and that shunt wire will promptly fuse. Thereupon, the circuit which includes the electric fuse 208 will be broken. The thermal mass of the heat-absorbing plate 216 will provide a desirable time delay before the heat-softenable solder can soften.

If a heavy overload or short circuit should occur, the elongated, readily-fusible portions 220, 222, 224 and 226 of the fusible elementss 246 and 248 or the elongated-readily-fusible portions 220, 222, 224 and 226 of the fusible elements 218 and 244, or the elongated, readily-fusible portions of all of those fusible elements will quickly fuse. Any arcs which tend to form as those fusible elements fuse will be quickly extinguished by the arc-quenching filler materials 301 and 302 which occupy the spaces between the discs 212 and 214 and the caps 294 and 298, respectively. As the elongated, readily-fusible portions of the readily fusible elements fuse, the shunt wire 284 also may fuse. If that shunt wire does not fuse as those elongated, readily-fusible portions fuse, it will fuse immediately thereafter and open the circuit. The filler material 301 is non-silicic—preferably calcium sulfate—and the filler material 302 is silicic.

The fusible elements 218, 244, 246 and 248 have large surface-to-volume ratios; and those ratios are much larger than the surface-to-volume ratios of the fuse links of prior dual element electric fuses. As a result, fusible elements 218, 244, 246 and 248 are able to dissipate much greater amounts of heat to the filler materials 301 and 302 than could the fuse links of those prior dual element electric fuses. This means that the total cross sectional areas of the "weak spots" 243 of fusible elements 218, 244, 246 and 248 can be smaller than the total cross sectional areas of the "weak spots" of those prior dual element electric fuses. Then, because each of the fusible elements 218, 244, 246 and 248 has a plurality of elongated, readily-fusible portions, the cross sectional area of each weak spot 243 will be quite small. The overall result is that the electric fuse 208 will have desirable current-limiting characteristics.

Referring to FIGS. 14–17, the numeral 303 generally denotes a third form of electric fuse that is made in accordance with the principles and teachings of the present invention. That electric fuse has a tubular casing 304 which can be made of fiber, glass melamine, or other suitable material. Circular discs 306 and 308 are dimensioned to fit snugly within that casing; and the disc 306 has openings 307 and 309 therein to accommodate tongues on the left-hand end of a heat-absorbing plate 310. The right-hand end of that heat-absorbing plate abuts the left-hand face of the disc 308.

The numeral 312 generally denotes a fusible element which is shown in detail in FIG. 17; and that fusible element has a tongue 314 with an opening 316 therein. Elongated, readily-fusible portions 318, 320, 322 and 324 are disposed to the right of that tongue; and the left-hand ends of the elongated, readily-fusible portions 322 and 324 are connected to that tongue. A transverse portion 326 connects the left-hand ends of the elongated, readily-fusible portions 318 and 320 with each other and with the tongue 314, as those elongated, readily-fusible portions are viewed in FIG. 17. A transverse portion 328 interconnects the right-hand ends of the elongated, readily-fusible portions 318, 320, 322 and 324, as those elongated, readily-fusible portions are viewed in FIG. 17. Openings 330 and 332 are formed in the transverse portion 328.

A number of transversely-extending slots 334 are formed in each of the elongated, readily-fusible portions 318, 320, 322 and 324. Those slots have lengths which are close to the width of those elongated, readily-fusible portions; and hence those slots form small "weak spots" 325 in those elongated, readily-fusible portions.

The numeral 336 denotes a metal terminal which has a T-shaped opening therein, and also has an opening which can accommodate a rivet 338. That rivet extends through the latter opening in the terminal 336, through an opening in a block 339 of metal which abuts the underface of the terminal 336, and extends through the opening 332 in the fusible element 312. That rivet fixedly secures that terminal, block and fusible element together. The tongue 314 of the fusible element 312 extends through a slot in the disc 308. An elongated bar 340 can be disposed within the T-shaped opening 337 in the terminal 336; and that bar has a length which is close to the outer diameter of tubular casing 304 of the electric fuse 303.

The numeral 342 generally denotes a fusible element which is identical to the fusible element 312. A rivet 346 extends through the opening 332 of the fusible element 342 and through an opening in a metal terminal 344. That rivet fixedly secures that fusible element to that terminal. The terminal 344 has a T-shaped opening 347 therein which can accommodate a bar 349; and that bar has a length which is close to the outer diameter of the tubular casing 304. The tongue 314 of the fusible element 342 extends through a slot in the disc 306 and overlies the upper face of the heat-absorbing plate 310.

A connector 345 is normally held in engagement with the tongue 314 of the fusible element 342 and in engagement with the heat-absorbing plate 310 by heat-softenable solder. A helical extension spring 348 has the left-hand end thereof extending into and made a part of the connector 345, and has the right-hand end thereof held by a hook 350 which, in turn, is held by the disc 308.

Soft solder will be applied to the transverse portion 328 of the fusible element 312 and to the abutting portions of the block 339. Soft solder also will be applied to the joint between that block and the terminal 336. Further, soft solder will be applied to the transverse portion 328 of the fusible element 342 and to the abutting portion of the terminal 344.

The heat-absorbing plate 310, the discs 306 and 308, the connector 345, the spring 348, the hook 350, the fusible elements 342 and 312, the block 339, and the terminals 336 and 344 constitute an electric fuse unit which can readily be handled as an entity. That electric fuse unit can readily be telescoped within the tubular casing 304, or that tubular casing can be readily telescoped over that electric fuse unit. Once the electric fuse unit has been disposed within the tubular casing 304, the elongated bars 349 and 340 can be disposed within the T-shaped openings 347 and 337, respectively, in the terminals 344 and 336.

Thereupon, a cup-shaped cap 352 can be telescoped over the left-hand end of the terminal 344 until the inner face of the closed end thereof abuts the elongated bar 349. At such time, openings in the cylindrical portion of that cap will be in alignment with openings in the casing 304; and fasteners 354, shown as screws, can be passed through those openings to hold that cap in assembled relation with that casing. Similarly, a cup-shaped cap 356 can be telescoped over the right-hand end of the terminal 336 until the inner face of the closed end thereof abuts the elongated bar 340. At such time, openings in the cylindrical portion of the cap 356 will be in alinement with openings in the casing 304. Fasteners 358, shown as screws, can be passed through those openings to maintain that cap in assembled relation with that casing. At this time, the portions of the terminals 344 and 336 which are immediately adjacent the outer faces of the caps 352 and 356 can be staked, as shown by FIGS. 14 and 15. The staked portions of those terminals will coact with the closed ends of those caps to prevent axial movement of the electric fuse unit relative to the casing 304.

The terminals 344 and 336 can be held by fuse clips; and current can then flow through terminal 344 via fusible element 342, connector 345, heat-absorbing plate 310, fusible element 312, block 339, and terminal 336. As long as the current does not exceed the rated current of the electric fuse 303, the heat-softenable solder will hold the connector 345 in electrically-conducting relation with the fusible element 342 and the heat-absorbing plate 310. However, if the current flowing through that electric fuse rises to a predetermined, relatively low overload level and remains there for a predetermined length of time, that solder will soften and permit the helical extension spring 348 to pull that connector away from the tongue 314 of the fusible element 342. Thereupon, the circuit protected by that electric fuse will be opened. If a heavy overload or a short circuit should occur, either the fusible element 342 or the fusible element 312, or both of them, would fuse and thereby open the circuit. Any arc which might form as the fusible elements 342 and 312 fused would quickly be extinguished by the arc-quenching filler materials 360 and 362 disposed in the spaces between the discs 306 and 308 and the caps 352 and 356. The filler material 360 is silicic and the filler material 362 is non-silicic—preferably calcium sulfate.

The fusible elements 342 and 312 have large surface-to-volume ratios, and have larger surface-to-volume ratios than do the fuse links of prior dual element fuses. This means that the fusible elements 342 and 312 are able to transfer heat to the filling materials 360 and 362 more rapidly than could those fuse links. As a result, the fusible elements 342 and 312 can have very small "weak spots," and thus can have desirable current-limiting characteristics.

The cross sectional area of the wide part, of each elongated, readily-fusible portion of each of the fusible elements of FIGS. 1–17, is much larger than the cross sectional area of each "weak spot" of that elongated, readily-fusible portion. Specifically, the cross sectional area of the wide part, of each elongated, readily-fusible portion of each of the fusible elements of FIGS. 1–17, is at least seven times larger than the cross sectional area of each "weak spot" of that elongated, readily- fusible portion. In fact, in the preferred form of the present invention, the cross sectional area of the wide part, of each elongated, readily-fusible portion of each of the fusible elements of FIGS. 1–17, is about ten times larger than the cross sectional area of each "weak spot" of that elongated, readily-fusible portion. Such large ratios between the cross sectional areas of the wide parts and of the "weak spots" of the elongated, readily-fusible portions of those fusible elements are important because they normally enable those wide parts to rapidly absorb most of the heat generated by those "weak spots." That rapid absorption of heat coacts with the absorption of heat from those "weak spots" by the arc-quenching filler materials to enable the cross sections of those "weak spots" to be small fractions of the cross sections of the "weak spots" of corresponding fuse links of prior dual element electric fuses.

The electric fuses of FIGS. 1–17 are adapted for use as "six hundred volt" fuses; and it should be noted that the five, serially-connected "weak spots" at one end of each of those electric fuses are in series relation with the five, serially-connected "weak spots" at the other end of that electric fuse. This means that the short circuit voltage drop across each "weak spot" will be only about one tenth of the total short circuit voltage drop across that electric fuse; and this is desirable for two reasons. First, because the short circuit voltage drop across each "weak spot" can be in the optimum range of fifty to seventy-five volts; and, second, because the lengths of the "weak spots" can be quite short. Because the short circuit voltage drop across each "weak spot" can be in the said optimum range, the maximum let-through current can be little, if any, greater than the let-through current at the time the "weak spots" start to fuse; and, further, the let-through current at the time the "weak spots" start to fuse can be low. All of this means that the electric fuses of FIGS. 1–17 will have extremely desirable current-limiting characteristics. Because the lengths of the "weak spots" can be quite short, the total volume of metal in each "weak spot" in the electric fuses of FIGS. 1–17 can be quite small; and this is desirable because it reduces the amount of metal that must fuse when the fusible elements open the circuit. Illustrative of the extent to which the volume of each "weak spot" can be reduced is the fact that the total volume of the largest "weak spot" in the fusible elements of FIGS. 1–17 is less than two one-hundred thousandths of a cubic inch. The widths of all of the "weak spots" in the fuses of FIGS. 1–17 will preferably be the same because the same die will preferably be used to form all of the fusible elements of those fuses. However, the fusible elements in the electric fuse of FIGS. 9–13 will preferably be two thousandths of an inch thicker, and the fusible elements of the electric fuse of FIGS. 14–17 will preferably be three thousandths of an inch thinner, than the fusible elements of the electric fuse of FIGS. 1–8. As a result, the volumes of the "weak spots" of the fusible elements in the various electric fuses of FIGS. 1–17 will preferably vary; but the total volume of the largest "weak spot" in the fusible elements of FIGS. 1–17 is less than two one-hundred thousandths of a cubic inch.

When the electric fuses of FIGS. 1–17 have been made as "two hundred and fifty volt" fuses, the number of "weak spots" have been reduced. For example, in one of those electric fuses which was to be used in a two hundred and twenty volt circuit, two serially-connected "weak spots" were provided at each end of that fuse. With that fuse, the short circuit voltage drop across each "weak spot" was in the optimum range of fifty to seventy-five volts, and the "weak spots" were quite short. Because the short circuit voltage drop across each "weak spot" of that electric fuse will be in the said optimum range, the maximum left-through current will be little, if any, greater than the let-through current at the time the "weak spots" start to fuse; and, further, the let-through current at the time the "weak spots" start to fuse will be low. All of this means that the said electric fuse will have extremely desirable current-limiting characteristics.

It is desirable that the normal current flowing through any given "weak spot" of a "six hundred volt" fuse be less than sixty amperes. With the six hundred ampere electric fuse of FIGS. 1–8, the normal current flowing through any given "weak spot" is less than forty amperes. With the four hundred ampere electric fuse of FIGS. 9–13, the normal current flowing through any given "weak spot" is about fifty amperes. With the two hundred and twenty-five ampere electric fuse of FIGS. 14–17, the normal current flowing through any given "weak spot" is less than fifty-seven amperes. As a result, optimum operation of the electric fuses of FIGS. 1–17 is assured.

The surface-to-volume ratios of the "weak spots" in the electric fuses of FIGS. 1–17 are very large. For example, those ratios are larger than one hundred and fifty to one and will preferably be as large as, or larger than, one hundred and seventy to one. Such very large ratios are important in transferring enough heat from those "weak spots" to the arc-quenching filler materials to enable those "weak spots" to be quite small.

The non-silicic filler materials 207, 301 and 362 surround and embed those portions of the fusible elements 116, 140, 142, 144, 246, 248 and 342 to which the connectors are connected. This is important because those filler materials will help quench any arcs which tend to form as those connectors move to open the circuit, and they will do so without forming current-conducting paths. If the silicic filler materials 206, 302 and 360 were to be used to surround and embed those portions of the fusible elements 116, 140, 142, 144, 246, 248 and 342 to which the connectors are connected, those filler materials could form current-conducting fulgurites as they helped quench any arcs which tended to form as those connectors moved to open the ciruit. Yet the silicic filler materials 206, 302 and 360, when used to surround and embed the opposite ends of those fusible elements, perform the vital function of making sure that no arc, which tends to form as the electric fuses open the circuit, can consume all of those fusible elements.

Whereas the drawing and accompanying description have shown and described several preferred embodiments of the present invention it should be apparent to those skilled in the art that various changes can be made in the form of the invention without affecting the scope thereof.

What I claim is:

1. An electric fuse that comprises:
(a) a terminal that is connectable into an electric circuit,
(b) a second terminal that is connectable into said electric circuit,
(c) a heat absorbing member interposed between said terminals, (d) a fusible element that has one end thereof electrically connected to the first said terminal and that has the other end thereof electrically connected to said heat absorbing member,
(e) a second fusible element that has one end thereof electrically connected to said second terminal and that has the other end thereof disposed adjacent said heat absorbing member,
(f) a connector,
(g) heat softenable solder that engages said heat absorbing member and said connector and releasably holds said connector in electrically-conducting relation with said terminals and said fusible elements and said heat absorbing member but that can respond to heat to soften to free said connector,
(h) a spring that biases said connector for movement out of said electrically conducting relation and that responds to softening of said heat softenable solder to move said connector out of said electrically conducting relation to open the circuit,
(i) each of said fusible elements having a plurality of elongated, longitudinally-extending, laterally-spaced, readily-fusible portions,
(j) said other end of said second fusible element being a narrow projection,
(k) said second fusible element having a laterally-extending portion that interconnects said other end thereof with said elongated, longitudinally-extending, laterally-spaced, readily-fusible portions thereof,
(l) said fusible elements being identical in size and form but being bent to have different configurations,
(m) said second fusible element having at least two of elongated, longitudinally-extending, laterally-spaced, readily-fusible portions disposed in angularly-displaced planes,
(n) said angularly-displaced planes facilitating radiation of heat by said two elongated, longitudinally-extending laterally-spaced, readily-fusible portions away from, rather than toward, each other,
(o) said other ends of said fusible elements being disposed in laterally-spaced planes,
(p) a casing that encloses said heat absorbing member, said connector, said spring, said fusible elements, and portions of said terminals, and
(q) arc-quenching filler material that surrounds and embeds said elongated, longitudinally-extending, laterally-spaced, readily-fusible portions of said fusible elements,
(r) said elongated, longitudinally-extending, laterally-spaced readily fusible portions being thin and having large current-limiting capabilities but not fusing prematurely, because said arc-quenching filler material absorbs heat from said elongated, longitudinally-extending laterally-spaced, readily-fusible portions.

2. An electric fuse that comprises:
(a) a terminal that is connectable into an electric circuit,
(b) a second terminal that is connectable into said electric circuit,
(c) a heat absorbing member interposed between said terminals and electrically connected to said second terminal,
(d) a fusible element that has one end thereof electrically connected to the first said terminal and that has the other end thereof disposed adjacent said heat absorbing member,
(e) a connector,
(f) heat softenable solder that engages said heat absorbing member and said connector and releasably holds said connector in said electrically-conducting relation with said terminals and said fusible element and said heat absorbing member but that can respond to heat to soften to free said connector,
(g) a spring that biases said connector for movement out of said electrically-conducting relation and that responds to softening of said heat softenable solder to move said connector out of said electrically conducting relation to open the circuit,
(h) said fusible element having a plurality of elongated, longitudinally - extending, laterally - spaced readily-fusible portions,
(i) said other end of said fusible element being a narrow projection,
(j) said fusible element having a laterally-extending portion that interconnects said other end thereof with said elongated, longitudinally-extending, laterally-spaced, readily-fusible portions thereof,
(k) said fusible element having at least two of said elongated, longitudinally-extending, laterally-spaced, readily-fusible portions disposed in angularly-displaced planes,
(l) said angularly-displaced planes facilitating radiation of heat by said two elongated, longitudinally-extending laterally-spaced, readily-fusible portions away from, rather than toward, each other,
(m) a casing that encloses said heat absorbing member, said connector, said spring, said fusible element, and portions of said terminals, and
(n) arc-quenching filler material that surrounds and embeds said elongated, longitudinally - extending, laterally-spaced, readily-fusible portions of said fusible element,
(o) said elongated, longitudinally-extending, laterally-spaced fusible, portions being thin and having large current-limiting capabilities but not fusing prematurely, because said arc-quenching filler material absorbs heat from said elongated, longitudinally-extending, laterally-spaced, readily-fusible portions.

3. An electric fuse that comprises:
(a) a terminal that is connectable into an electric circuit,
(b) a second terrminal that is connectable into said electric circuit,
(c) a heat absorbing member interposed between said terminals and electrically connected to one of said terminals,
(d) a fusible element that is interposed between said heat absorbing member and the other of said terminals and that is electrically connected to said other of said terminals,
(e) a connector,
(f) heat softenable solder that engages said heat absorbing member and said connector and releasably holds said connector in said electrically-conducting relation with said terminals and said fusible element and said heat absorbing member but that can respond to heat to soften to free said connector,
(g) a spring that biases said connector for movement out of said electrically-conducting relation and that responds to softening of said heat softenable solder to move said connector out of said electrically conducting relations to open the circuit,
(h) said fusible element having a plurality of elongated, longitudinally - extending, laterally - spaced, readily-fusible portions,
(i) said fusible element having a laterally-extending portion that interconnects said elongated, longitudinally-extending, laterally-spaced, readily-fusible portions thereof,
(j) a casing that encloses said heat absorbing member, said connector, said spring, said fusible element, and portions of said terminals, and
(k) arc-quenching filler material that surrounds and embeds said elongated, longitudinally-extending, laterally-spaced readily-fusible portions of said fusible element,
(l) said elongated, longitudinally-extending, laterally-spaced, readily-fusible portions of said fusible element radiating heat into said arc-quenching filler material rather than into each other whereby said elongated, longitudinally-extending, laterally-spaced, fusible portions are thin and have large current-limiting capabilities but will not fuse prematurely, because said arc-quenching filler material absorbs heat from said elongated, longitudinally-extending, laterally-spaced, readily-fusible portions.

4. An electric fuse that comprises:
(a) a terminal that is connectable into an electric circuit,
(b) a second terminal that is connectable into said electric circuit,
(c) a fusible element that is interposed between and electricaly connected to said terminals,
(d) said fusible element haviing a plurality of elongated, longitudinally - extending, laterally - spaced, readily-fusible portions,
(e) one end of said fusible element being a narrow projection,
(f) said fusible element having a laterally-extending portion that interconnects said one end thereof with said elongaed, longitudinally - extending, laterally-spaced, readily-fusible portions thereof,
(g) said fusible element having at least two of said elongated, longitudinally-extending, laterally-spaced, readily-fusile portions disposed in angularly-displaced planes,
(h) said angularly-displaced planes facilitating radiation of heat by said two elongated longitudinally-extending, laterally-spaced, readily-fusible portions away from, rather than toward, each other,
(i) a casing that encloses said fusible element and portions of said terminals, and
(j) arc-quenching filler material that surrounds and embeds said elongated, longitudinally - extending-laterally-spaced, readily-fusible portions of said fusible element,
(k) said elongated, longitudinally-extending, laterally-spaced, readily-fusible portions of said fusible element being thin and having large current-limiting capabilities but not fusing prematurely, because said arc-quenching filler material absorbs heat from said elongated, longitudinally-extending, laterally-spaced, readily-fusible portions.

5. An electric fuse that comprises:
(a) a terminal that is connectable into an electric circuit,
(b) a second terminal that is connectable into said electric circuit,
(c) a fusible element that is interposed between and electrically connected to said terminals,
(d) said fusible element having a plurality of elongated, longitudinally - extending, laterally - spaced, readily-fusible portions,
(e) said fusible element having a laterally-extending portion that interconnects said elongated, longitudinally-extending, laterally-spaced, readily-fusible portions thereof,
(f) said fusible element having at least two of said elongated, longitudinally-extending, laterally-spaced, readily - fusible portions disposed in angularly - displaced planes, and
(g) a casing that encloses said fusible element and portions of said terminals,
(h) said angularly-displaced planes facilitating radiation of heat by said two elongated, longitudinally-extending, laterally-spaced, readily-fusible portions away from, rather than toward, each other,
(i) said elongated, longitudinally-extending, laterally-spaced, readily-fusible portions of said fusible element providing a large surface-to-volume ratio for said fusible element, whereby said elongated, longitudinally-extending, laterally-spaced, fusible portions are thin and have large current-limiting capabilities but do not fuse prematurely, because said arc-quenching filler material absorbs heat from said elongated, longitudinally-extending, laterally-spaced, readily-fusible portions.

6. An electric fuse that comprises:
(a) a terminal that is connectable into an electric circuit,
(b) a second terminal that is connectable into said electric circuit,
(c) a fusible element that is interposed between said terminals and that is electrically connected to one of said terminals,
(d) said fusible element having a plurality of elongated, longitudinally - extending, laterally - spaced, readily-fusible portions,
(e) a connector,
(f) heat softenable solder that is connected to the other of said terminals and that engages said connector and releasably holds said connector in said electrically-conducting relations but that can respond to heat to soften to free said connector,
(g) a spring that biases said connector for movement out of said electrically-conducting relation with said terminals and said fusible element to open the circuit ,
(h) said fusible element having a laterally-extending portion that interconnects said elongated, longitudinally-extending, laterally-spaced, readily-fusible portions thereof,
(i) a casing that encloses said fusible element, said connector, said spring, and portions of said terminals, and
(j) arc-quenching filler material that surrounds and embeds said elongated, longitudinally-extending, laterally-spaced, readily-fusible portions of said fusible element,
(k) said elongated, longitudinally-extending, laterally-spaced, readily-fusible portions of said fusible element radiating heat into said arc-quenching filler material rather than into each other whereby said elongated, longitudinally-extending, laterally-spaced, fusible portions are thin and have large current-limiting capabilities but will not fuse prematurely, because said arc-quenching filler material absorbs heat from said elongated, longitudinally - extending, laterally-spaced, readily-fusible portions.

7. In an electric fuse which has a terminal, a connector, and a fusible element that is electrically connected between said terminal and said connector, the improvement which comprises forming said fusible element as a plurality of elongated, longitudinally-extending, laterally-spaced, readily-fusible portions, a projecting end on said fusible element, and a laterally-extending portion on said fusible element which interconnects said elongated, longitudinally-extending portions and said projecting end, said elongated longitudinally-extending portions being embedded in and surrounded by filler material, said filler material absorbing heat from said elongated, longitudinally-extending portions, whereby said elongated longitudinally-extending portions are thin and have large current-limiting capabilities but will not fuse prematurely, because said arc-quenching filler material absorbs heat from said elongated, longitudinally-extending, laterally-spaced, readily-fusible portions, said fusible element having at least two of said elongated, longitudinally-extending, laterally-spaced, readily-fusible portions disposed in angularly-displaced planes, said angularly-displaced planes facilitating radiation of heat by said two elongated, longitudinally - extending, laterally - spaced, readily fusible portions away from, rather than toward, each other.

8. In an electric fuse which has a terminal, a connector, and a fusible element that is electrically connected between said terminal and said connector, the improvement which comprises forming said fusible element as a plurality of longitudinally-extending, laterally-spaced, readily-fusible portions, a projecting end on said fusible element, and a laterally-extending portion on said fusible element which interconnects said longitudinally-extending portions and said projecting end, said longitudinally-extending portions being embedded in and surrounded by filler material, said filler material absorbing heat from said longitudinally-extending portions, whereby said longitudinally-extending portions are thin and have large current-limiting capabilities but will not fuse prematurely, because said arc-quenching filler material absorbs heat from said elongated, longitudinally-extending, laterally-spaced, readily-fusible portions, said fusible element having at least one of said longitudinally-extending portions thereof disposed in one plane, having a second longitudinally-extending portion thereof disposed in a second plane which is angularly spaced from the first said plane, and having a third longitudinally-extending portion thereof disposed in a plane which is angularly spaced from both the first said and said second plane, said projecting portion of said fusible element lying in said second plane, the angular displacement of said planes facilitating radiation of heat by said longitudinally-extending portions away from, rather than toward, each other.

9. An electric fuse that comprises:

(a) a terminal that is connectable into an electric circuit, (b) a second terminal that is connectable into said electric circuit, (c) a fusible element and a connector, (d) heat softenable solder that releasably holds said fusible element and said connector in electrically-conducting relation with said terminals but that can respond to heat to soften to free said connector, (e) a spring that biases said connector for movement out of said electrically-conducting relation and that responds to softening of said heat softenable solder to move said connector out of said electrically conducting relation to open the circuit.

(f) a casing that encloses said fusible element, said connector, said spring, and portions of said terminals, and (g) arc-quenching filler materials that surround and embed said fusible element, (h) one of said filler materials being non-silicic and surrounding and embedding that end of said fusible element which is adjacent said connector, (i) the other of said filler materials being silicic and surrounding and embedding a portion of said fusible element which is spaced from said connector.

References Cited by the Examiner

UNITED STATES PATENTS

| | | | |
|---|---|---|---|
| 931,476 | 8/1909 | Poole | 200—135 |
| 1,157,919 | 10/1915 | Arsem | 200—120 |
| 1,774,252 | 8/1930 | Bussmann | 200—135 |
| 2,111,749 | 3/1938 | Bussmann | 200—123 |
| 2,300,620 | 11/1942 | Duerkob | 200—123 |
| 2,592,399 | 4/1952 | Edsall et al. | 200—135 |
| 2,658,974 | 11/1953 | Kozacka | 200—120 |
| 2,665,348 | 1/1954 | Kozacka | 200—135 |
| 2,777,033 | 1/1957 | Kozacka | 200—120 |
| 2,861,150 | 11/1958 | Swain | 200—120 |
| 3,123,693 | 3/1964 | Kozacka | 200—120 |

FOREIGN PATENTS

| | | |
|---|---|---|
| 29,377 | 12/1904 | Great Britain. |
| 514,373 | 2/1938 | Great Britain. |
| 807,347 | 1/1959 | Great Britain. |
| 813,643 | 5/1959 | Great Britain. |
| 95,206 | 12/1959 | Norway. |

BERNARD A. GILHEANY, *Primary Examiner.*